United States Patent
Koike

(10) Patent No.: US 9,802,313 B2
(45) Date of Patent: Oct. 31, 2017

(54) INDUSTRIAL-USE ROBOT AND CONTROL SYSTEM AND CONTROL METHOD FOR CONTROLLING OPERATION OF PERIPHERAL DEVICE

(71) Applicant: KOBE STEEL, LTD., Kobe-shi (JP)

(72) Inventor: Takeshi Koike, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 16 days.

(21) Appl. No.: 14/891,209

(22) PCT Filed: Apr. 17, 2014

(86) PCT No.: PCT/JP2014/060964
§ 371 (c)(1),
(2) Date: Nov. 13, 2015

(87) PCT Pub. No.: WO2014/185215
PCT Pub. Date: Nov. 20, 2014

(65) Prior Publication Data
US 2016/0089784 A1    Mar. 31, 2016

(30) Foreign Application Priority Data
May 16, 2013   (JP) .................................. 2013-103752

(51) Int. Cl.
B25J 9/16        (2006.01)
B23K 9/10        (2006.01)
G05B 19/418      (2006.01)

(52) U.S. Cl.
CPC ................. B25J 9/163 (2013.01); B23K 9/10 (2013.01); B25J 9/1664 (2013.01);
(Continued)

(58) Field of Classification Search
CPC ....... B25J 9/163; B25J 9/1664; Y10S 901/03; G06F 11/3664; G06F 11/1658;
(Continued)

(56) References Cited

U.S. PATENT DOCUMENTS 4,486,843 A * 12/1984 Spongh .................. B25J 9/1661
                                                        318/568.14
4,685,067 A *  8/1987 French ................... G05B 19/42
                                                        318/568.13
(Continued)

FOREIGN PATENT DOCUMENTS

JP    01-281504 A    11/1989
JP    02-064713 A     3/1990
(Continued)

OTHER PUBLICATIONS

International Preliminary Report on Patentability and Written Opinion issued Nov. 26, 2015 in PCT/JP2014/060964 filed Apr. 17, 2014 (submitting English translation only).
(Continued)

*Primary Examiner* — Dalena Tran
(74) *Attorney, Agent, or Firm* — Oblon, McClelland, Maier & Neustadt, L.L.P.

(57) ABSTRACT

A total time necessary for work is shortened by reducing program correcting. A control device has a teaching program storage storing a teaching program, a command interpreter transmitting a movement-related command to a movement-related command separator, determining whether the command is a synchronous interval command or an asynchronous interval command and separating the movement-related command into command of each device according to a determination result, and executing a non-movement-related command, a movement-related command buffer selecting one of the transmission of the movement-related command to the sub-locus calculator and accumulating
(Continued)

movement-related command therein based on a device movement state, a main locus calculator calculating movement information on the device on which synchronous control is performed from the movement-related command, a sub-locus calculator calculating movement information on the device that is not a synchronous control target based on the movement-related command, and a motor driver performing operations of the devices.

6 Claims, 11 Drawing Sheets

(52) U.S. Cl.
CPC .............. *G05B 19/41815* (2013.01); *G05B 2219/39102* (2013.01); *G05B 2219/45104* (2013.01); *Y02P 90/08* (2015.11); *Y10S 901/03* (2013.01)

(58) Field of Classification Search
CPC ........... G06F 9/4411; G05B 19/41815; G05B 2219/39102; G05B 2219/45104; G05B 2219/36495

USPC ..... 700/245, 250; 318/568.13; 901/3, 41, 42
See application file for complete search history.

(56) References Cited

U.S. PATENT DOCUMENTS 5,353,386 A * 10/1994 Kasagami .............. B25J 9/1682
700/247
2002/0029095 A1    3/2002 Kosaka et al.

FOREIGN PATENT DOCUMENTS

| JP | 2001-138275 A | 5/2001 |
| JP | 2002-073127 A | 3/2002 |
| JP | 2005-346740 A | 12/2005 |
| JP | 2009-026171 A | 2/2009 |
| WO | WO 2004/048049 A1 | 6/2004 |

OTHER PUBLICATIONS

European Search Report dated May 31, 2017 in European Application No. 14797513.0 (12 pages).

* cited by examiner

*Fig.4*

```
1 CALL TEACHING PROGRAM B  ROBOT WITHDRAWAL PROGRAM
2 ASYNCHRONOUS INTERVAL    POSITIONER START
3 CALL TEACHING PROGRAM C  POSITIONER RETURN TO ORIGINAL POSITION
4 CALL TEACHING PROGRAM D  WIRE CUT
5 ASYNCHRONOUS INTERVAL    POSITIONER WAIT
```

Fig.6A

| | | |
|---|---|---|
| 1 | MOVEMENT COMMAND | ROBOT POSITION A |
| 2 | MOVEMENT COMMAND | ROBOT POSITION B |

Fig.6B

| | | |
|---|---|---|
| 1 | MOVEMENT COMMAND | POSITIONER POSITION A |
| 2 | MOVEMENT COMMAND | POSITIONER POSITION B |
| 3 | SET MOVING SPEED | POSITIONER 10% |
| 4 | MOVEMENT COMMAND | POSITIONER POSITION C |
| 5 | SET MOVING SPEED | POSITIONER 100% |

Fig.6C

| | | |
|---|---|---|
| 1 | POSITIONING UNNECESSITY | POSITIONER |
| 2 | MOVEMENT COMMAND | ROBOT POSITION C |
| 3 | MOVEMENT COMMAND | ROBOT POSITION D |
| 4 | OUTPUT COMMAND | WIRE CUTTING SIGNAL ON |
| 5 | TIME WAITING COMMAND | 1 SECOND |
| 6 | INPUT WAITING COMMAND | WIRE CUTTING COMPLETION ON |
| 7 | MOVEMENT COMMAND | ROBOT POSITION E |

*Fig.7*

| | | |
|---|---|---|
| 5 | MOVEMENT SPEED SETTING | POSITIONER 100% |
| 4 | MOVEMENT COMMAND | POSITIONER POSITION C (ONLY FOR POSITIONER) |
| 3 | SETTING MOVING SPEED | POSITIONER 10% |
| 2 | MOVEMENT COMMAND | POSITIONER POSITION B (ONLY FOR POSITIONER) |

*Fig.8*

```
1  TEACHING PROGRAM CALL E
2  ASYNCHRONOUS INTERVAL   SLIDER START
3  TEACHING PROGRAM CALL F
4  ASYNCHRONOUS INTERVAL   POSITIONER START
5  TEACHING PROGRAM CALL G
6  TEACHING PROGRAM CALL H
7  ASYNCHRONOUS INTERVAL   SLIDER MEET
8  ASYNCHRONOUS INTERVAL   POSITIONER MEET
```

INDUSTRIAL-USE ROBOT AND CONTROL SYSTEM AND CONTROL METHOD FOR CONTROLLING OPERATION OF PERIPHERAL DEVICE

TECHNICAL FIELD

The present invention relates to a control system and a control method for controlling operations of an industrial robot and peripheral device.

BACKGROUND ART

When teaching data is provided to the industrial robot such as a welding robot performing welding and a peripheral device of the industrial robot, the industrial robot and the peripheral device operate works set by the teaching data. For example, the teaching data is constructed with a set of programs in which the operations performed by the industrial robot and the peripheral device are described.

For example, according to Patent Document 1, in a machinery control device that controls plural control targets constructed with two axes or more, an actuator and the control target are correlated with each other in controlling the actuator such as a motor driving each axis of each control target, whereby operation commands to the control target are output while distributed to predetermined actuators. Only a teaching position of the selected control target is registered in a work program, and the work program is independently executed.

According to Patent Document 2, in a robot control device that moves plural control targets, an asynchronous control interval of an interval in which a manipulator and a positioner of the control targets are asynchronously controlled in one work program is set, and the control targets are not synchronously controlled at the same time, but the control targets are controlled so as to arrive separately at movement targets.

PRIOR ART DOCUMENTS

Patent Documents

Patent Document 1: JP 2005-346740 A
Patent Document 2: JP 2009-26171 A

SUMMARY OF THE INVENTION

Problems to be Solved by the Invention

In a program in which operations performed by the industrial robot and the peripheral device is described, sometimes the operations of the devices are controlled so as to be synchronous with each other. In order to shorten the total time necessary for the work in such cases, the program is produced in consideration of a relationship between operations of the industrial robot and the peripheral device. There is a demand for shortening a time necessary for the production of the program. When an interval in which each device is not synchronously controlled is set, sometimes the commands of the program are not executed in the described order.

An object of the present invention is to shorten the total time necessary for the work by reducing program correcting work.

Means for Solving the Problem

In view of the object, the present invention provides a control system comprising, a storage in which a teaching program is stored, operations performed by a robot and a peripheral device being described in the teaching program, a determination unit discriminates an operation of the peripheral device in the teaching program stored in the storage is an asynchronous interval where the operation of the peripheral device is not synchronized with an operation of the robot or a synchronous interval where the operation of the peripheral device is synchronized with the operation of the robot, and determines whether a movement-related command in command of the teaching program is a command in the asynchronous interval or a command in the synchronous interval, the movement-related command being a command related to movement of at least one of the robot and the peripheral device, a separator that separates an asynchronous command determined to be the command in the asynchronous interval by the determination unit into commands of the robot and the peripheral device, a first controller that synchronously controls the operations of the robot and the peripheral device based on a synchronous command determined to be the command in the synchronous interval by the determination unit, and controls the operation of the robot based on a command related to the robot in the asynchronous command separated by the separator, and a second controller that controls the operation of the peripheral device without synchronizing with the operation of the robot based on a command related to the peripheral device in the asynchronous command separated by the separator.

Further, the control system comprises a storage unit in which the commands related to the peripheral device in the asynchronous command separated by the separator is stored, the commands being acquired while the second controller controls the operation of the peripheral device, and the commands being stored in an order in which the commands are acquired, wherein the second controller executes the commands stored in the storage unit in the order in which the commands are acquired.

Furthermore, when a peripheral device group including one or a plurality of devices other than the peripheral device exists, and when, in the asynchronous interval, the operation of the peripheral device group is controlled in synchronization with the operation of the robot while the operation of the peripheral device is controlled without synchronizing with the operation of the robot. In the asynchronous interval, the first controller synchronously controls the operations of the robot and the peripheral device group based on the commands related to the robot and the peripheral device group in the asynchronous command separated by the separator. In the asynchronous interval, the second controller controls the operation of the peripheral device without synchronizing with the operations of the robot and the peripheral device group based on the commands related to the peripheral device in the asynchronous command separated by the separator.

When one or a plurality of devices exits in addition to the peripheral device, in an interval in which at least parts of the asynchronous intervals of the peripheral devices overlap each other, the second controller controls the operations of the peripheral devices in which the asynchronous interval is provided in the overlapping interval without synchronizing the operations of the robot and other peripheral devices.

The movement-related command is described in a sub-teaching program called by a main teaching program in the teaching program.

Another aspect of the present invention provides a method for controlling a robot and a peripheral device comprising the steps of discriminating between an asynchronous interval and a synchronous interval with respect to a command group related to operation performed by a robot and a peripheral device, the command group being stored in a predetermined storage, the operation of the peripheral device being not synchronized with the operation of the robot in the asynchronous interval, the synchronous interval being not the asynchronous interval, and determining whether a movement-related command in command group is a command in the asynchronous interval or a command in the synchronous interval, the movement-related command being a command related to movement of at least one of the robot and the peripheral device, separating an asynchronous command determined to be the command in the asynchronous interval into commands of the robot and the peripheral device, controlling synchronously the operations of the robot and the peripheral device based on a synchronous command determined to be the command in the synchronous interval, and controlling the operation of the robot based on a command related to the robot in the separated asynchronous command, and controlling the operation of the peripheral device without synchronizing with the operation of the robot based on a command related to the peripheral device in the separated asynchronous command.

EFFECT OF THE INVENTION

According to the invention, a total time necessary for work is shortened by reducing program correcting.

BRIEF DESCRIPTION OF THE DRAWINGS

FIG. 4 is a diagram showing an example of main teaching program according to the embodiment;

FIG. 6A is a diagram showing an example of sub-teaching program according to the embodiment;

FIG. 6B is a diagram showing the example of sub-teaching program according to the embodiment;

FIG. 6C is a diagram showing the example of sub-teaching program according to the embodiment;

FIG. 7 is a diagram showing a state where a movement-related command buffer stores movement-related command; and FIG. 8 is a diagram showing an example of the main teaching program according to the embodiment where asynchronous intervals are overlapped.

MODE FOR CARRYING OUT THE INVENTION

Figure 1:
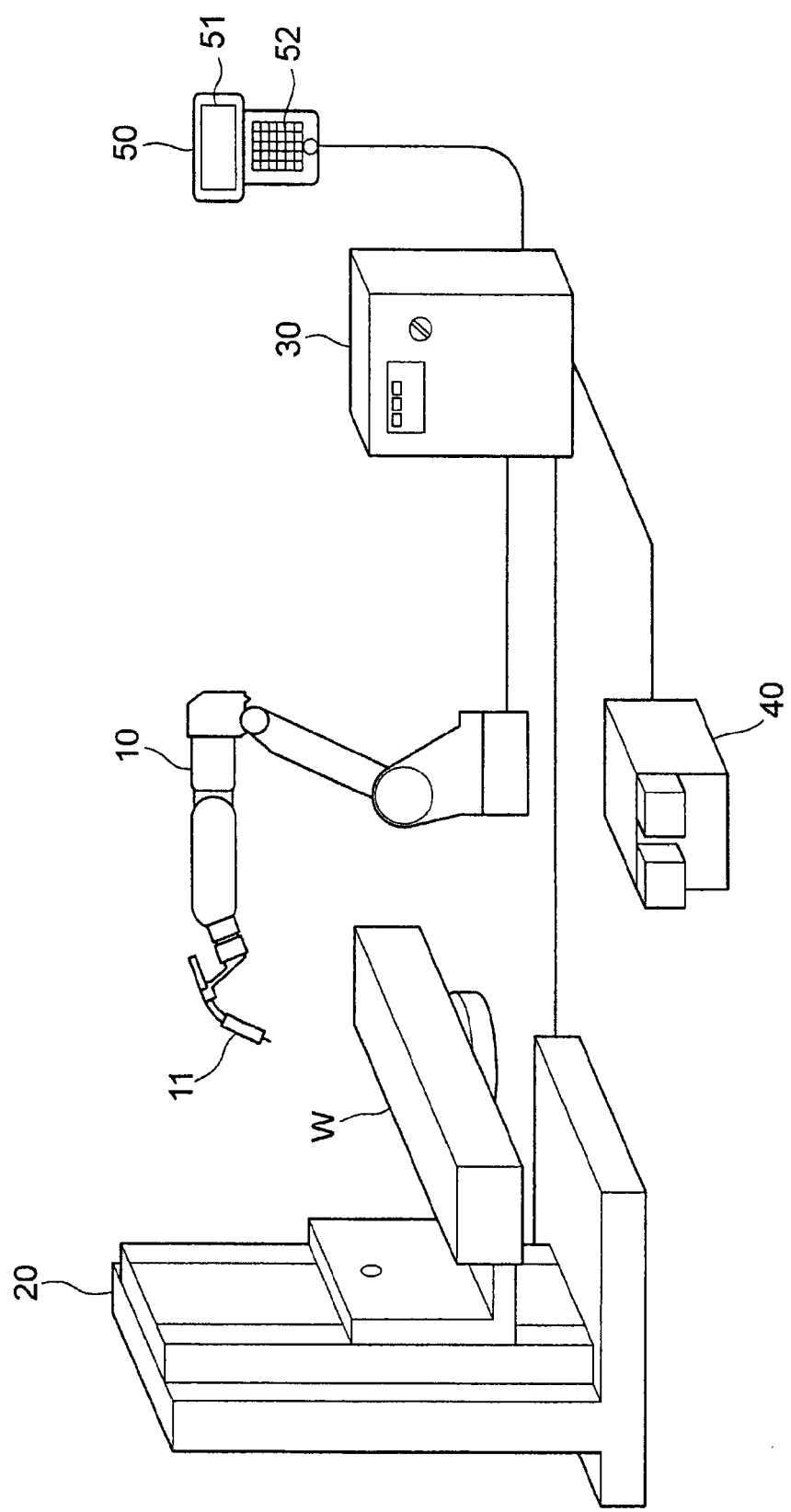
FIG. 1 is a diagram showing a general construction of a welding robot system according to an embodiment.

Hereinafter, an embodiment of the present invention will be described in detail with reference to the accompanying drawings. An outline of the embodiment will be described below.

Nowadays, a peripheral device controlled by a control device (robot controller) together with a welding robot is enlarged in a welding robot system. A positioner that is of a device positioning a workpiece of a welding target and a slider that is of a device moving the welding robot can be cited as an example of the peripheral device. For example, in the workpiece positioning using the positioner in attaching and detaching the workpiece, or in the slider operation to withdraw the welding robot to a position where the welding robot does not interrupt the operation of the slider positioner, a time necessary to operate the peripheral device is lengthened before starting of the welding with enlargement of the peripheral device. This leads to an increase in cycle time of a total time necessary for the welding of one workpiece. Additionally, welding-related work such as wire cutting of the welding robot and nozzle replacement also causes the increases in cycle time.

At this point, the operations performed by the welding robot and the peripheral device are defined in a teaching program, and the teaching program includes a movement command to move each device, a command to specify a movement condition such as a moving speed in relation to the movement command, and a command to cause the welding robot to cut the wire. The movement command includes a target position of the welding robot or peripheral device, and sometimes the operations of the devices are controlled in synchronization with each other by executing the movement command. For example, by one movement command, sometimes the devices are controlled so as to simultaneously start to move toward target positions of the devices and so as to arrive simultaneously at the target positions. In such cases, the moving speeds of the devices are adjusted in accordance with the device in which a movement time to the target position becomes the longest.

In order to shorten the cycle time in such situations, for example, it is conceivable that the welding robot and the peripheral device are independently moved, and that the welding robot performs other operations such as the wire cutting in parallel to the movement of the peripheral device. However, it is necessary for an operator to individually produce the teaching program, in which the operations of the devices are mixed in consideration of a relationship between the operations of the devices, in each work in order to perform the operations of the devices. For example, in the case that the welding robot cuts the wire while the positioner positions the workpiece, it is necessary to individually produce a program causing the welding robot to cut the wire while specifying the operation of the welding robot in accordance with each the movement command issued to the positioner. It is also necessary to individually produce a program with respect to the case that the welding robot cuts the wire while the positioner positions the workpiece and the case that the welding robot does not cut the wire while the positioner positions the workpiece.

Therefore, a time necessary for production of the teaching program increases. It is also conceivable that a content of the teaching program is hardly checked, and that the cycle time is not shortened depending on a skill of a producer of the teaching program. It is necessary to execute the commands of the teaching program in the described order. However, sometimes the commands are not executed in the described order only by setting an interval in which the devices are asynchronously controlled in the teaching program.

For this reason, a procedure to shorten the cycle time by reducing program correction work program will be described below.

(System Configuration)

FIG. 1 is a view illustrating a schematic configuration of the welding robot system of the embodiment.

As illustrated in FIG. 1, the welding robot system includes a welding robot 10 that performs various kinds of work related to the welding, a positioner 20 of an example of the peripheral device that positions a workpiece W, a control device 30 that controls each device of the welding robot system, a wire cutter 40 that cuts a wire, and a teaching pendant 50 that is used in setting for welding work and production of a teaching program. Although not illustrated in the example of FIG. 1, for example, the welding robot system of the embodiment may include another peripheral device such as a slider (not illustrated) that is disposed below the welding robot 10 to move the welding robot 10.

The welding robot 10 includes an arm having plural joints, and performs various works related to the welding based on the teaching program. A welding torch 11 is provided at a front edge of the arm of the welding robot 10 in order to perform the welding work on the workpiece W.

The positioner 20 adjusts the position of the workpiece W based on the teaching program.

Although described in detail later, the control device 30 includes a storage device (memory) in which the previously-taught teaching program is stored and a processing device (CPU) that to read the teaching program to control the operations of the welding robot 10, positioner 20, and wire cutter 40. Sometimes the teaching program is transmitted from the teaching pendant 50, or sometimes the teaching program is produced by a teaching program producing device (not illustrated) and transmitted by data communication. Sometimes the teaching program is transferred to the control device 30 through a removable storage medium such as a memory card.

The wire cutter 40 cuts the wire attached to the welding robot 10.

The teaching pendant 50 is used when the operator sets a welding path and a welding work condition or produces the teaching program in, order to cause the welding robot 10 to perform the welding work. The teaching pendant 50 includes a display screen 51 constructed with a liquid crystal display or the like and an input button 52.

(Hardware Configuration of Control Device)

Figure 2:
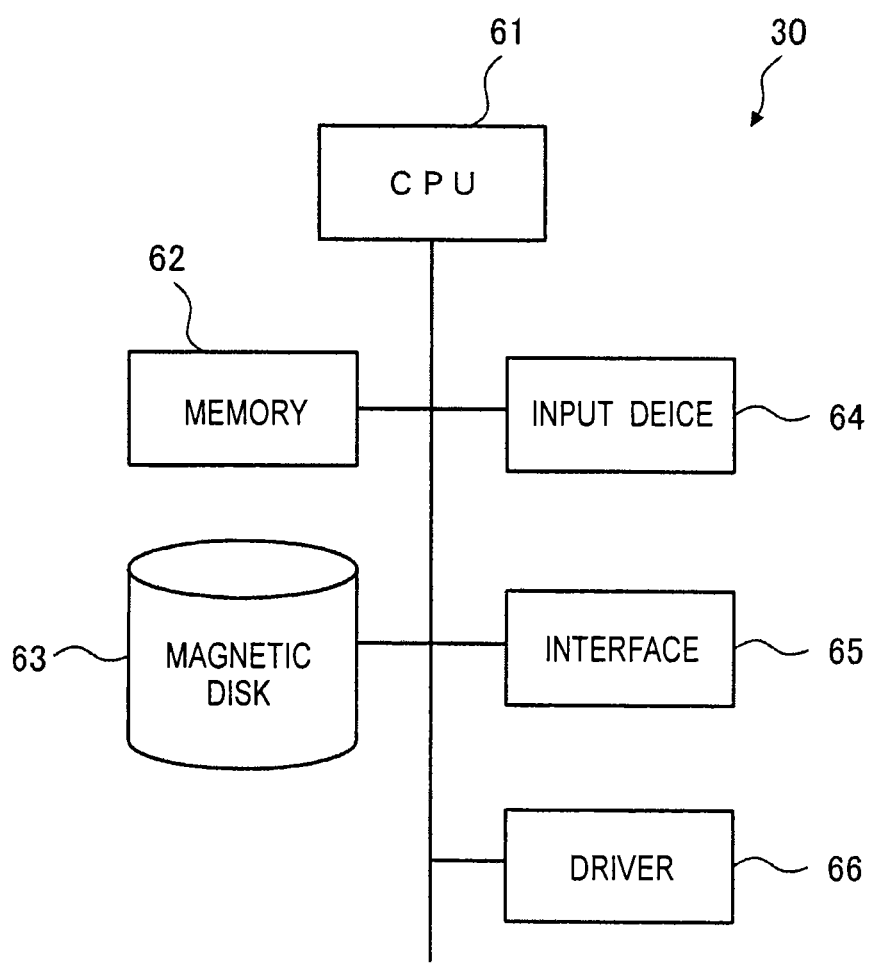
FIG. 2 is a diagram showing a hardware construction of a control device according to the embodiment of the present invention.

FIG. 2 is a view illustrating a hardware configuration example of the control device of the embodiment.

As illustrated in FIG. 2, the control device 30 includes a CPU (Central Processing Unit) 61 of calculation means and a memory 62 of main storage means. The control device 30 includes a magnetic disk device (such as a Hard Disk Drive (HDD)) 63 as an external device and an input device 64 such as a keyboard and a mouse. The control device 30 includes an interface 65 that transmits and receives data to and from the external device and a driver 66 that writes and reads data in and from the storage medium. FIG. 2 illustrates the hardware configuration when the control device 30 is constructed with a computer system only by way of example. However, the control device 30 is not limited to the configuration in FIG. 2.

(Functional Configuration of Control Device)

Figure 3:
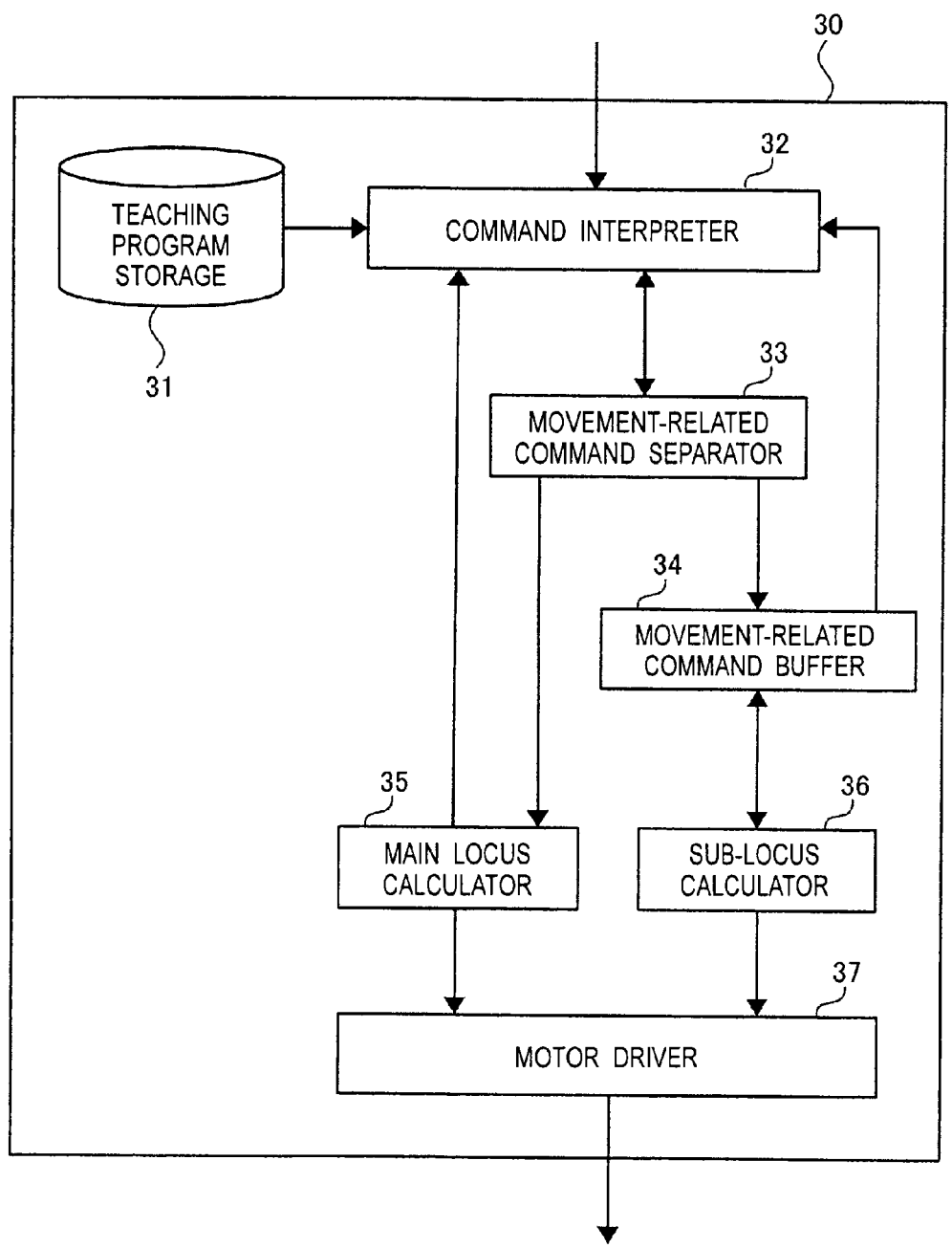
FIG. 3 is a block diagram showing an example of functional construction of the control device according to the embodiment.

FIG. 3 is a block diagram illustrating a functional configuration example of the control device 30 of the embodiment.

As illustrated in FIG. 3, the control device 30 includes a teaching program storage 31 in which the teaching program is stored, a command interpreter 32, and a movement-related command separator 33. The command interpreter 32 transmits a movement-related command to the movement-related command separator 33, and executes a non-movement-related command. The movement-related command separator 33 determines whether the command is a synchronous interval command or an asynchronous interval command, and separates the movement-related command into command of each device according to a determination result. The control device 30 also includes a movement-related command buffer 34, a main locus calculator 35, a sub-locus calculator 36, and a motor driver 37. The movement-related command buffer 34 selects one of the transmission of the movement-related command to the sub-locus calculator 36 and accumulation of the movement-related command in the movement-related command buffer 34 based on a device movement state. The main locus calculator 35 calculates movement information on the device on which the synchronous control is performed based on the movement-related command. The sub-locus calculator 36 calculates movement information on the device that is not a synchronous control target based on the movement-related command. The motor driver 37 performs the operations of the devices.

For example, the command interpreter 32, the movement-related command separator 33, the movement-related command buffer 34, the main locus calculator 35, the sub-locus calculator 36, and the motor driver 37 are constructed with a CPU 61 in the hardware configuration of FIG. 2. More specifically, a program causing a computer to implement the function of the control device 30 of the embodiment is stored in the magnetic disk device 63 through the driver 66 or the interface 65, the program is expanded on the memory 62, and the CPU 61 executes the program, thereby implementing the functions of the command interpreter 32, movement-related command separator 33, movement-related command buffer 34, main locus calculator 35, sub-locus calculator 36, and motor driver 37. For example, the movement-related command buffer 34 is also constructed with the storage such as the memory 62 and the magnetic disk device 63 in the hardware configuration in FIG. 2. The teaching program storage 31 is also constructed with the storage such as the memory 62 and the magnetic disk device 63.

The previously-taught teaching program is stored in the teaching program storage 31 that is of an example of the storage means. The teaching program is transmitted to the command interpreter 32 in response to a request from the command interpreter 32.

The command interpreter 32 receives input from the outside, and acquires the teaching program corresponding to the received input from the teaching program storage 31. For example, the input is performed from the teaching pendant 50 (see FIG. 1) through the interface 65 in FIG. 2, or the operator performs the input by manipulating the input device 64 in FIG. 2. The command interpreter 32 determines whether the command of the acquired teaching program is the movement-related command or the non-movement-related command.

When the acquired command is the movement-related command, the command interpreter 32 transmits the movement-related command to the movement-related command separator 33. When the acquired command is the non-movement-related command, the command interpreter 32 executes the non-movement-related command. At this point, as described above, the movement-related command includes the movement command to move each device and the command to specify the movement condition such as the moving speed in relation to the movement command. The non-movement-related command includes an IO input and output command to cause the welding robot 10 to perform the wire cutting or the nozzle replacement.

When executing the command to end the asynchronous interval of the asynchronous target device, the command interpreter 32 waits for a request of the movement-related command from main locus calculator 35, and waits for a notification that the movement of the asynchronous target device is completed from the movement-related command buffer 34. When receiving both command request and the notification of the movement completion, the command interpreter 32 ends the asynchronous interval of the asynchronous target device, and performs the processing of the next command.

The movement-related command separator 33 that is an example of the determination means and the separation means discriminates between the asynchronous interval and the synchronous interval in the teaching program, and determines whether the movement-related command acquired from the command interpreter 32 is the command of the asynchronous interval or the command of the synchronous interval. As used herein, the synchronous interval means an interval at which the operations of the welding robot 10 and the device set to the synchronous control target (hereinafter, the device set to the synchronous control target is referred to as a synchronous target device) in devices, such as the positioner 20, which are of the peripheral devices of the welding robot 10, are synchronously controlled. The synchronous control means control in which plural devices starting simultaneously from present positions arrive simultaneously at the target positions by deciding the moving speeds of remaining devices of the plural devices in synchronization with the device having the longest movement time to the target position.

The asynchronous interval means an interval at which the operations of the welding robot 10 and the device set to the device that is not the synchronous control target (hereinafter, the device set to the device that is not the synchronous control target is referred to as an asynchronous target device) in devices, such as the positioner 20, which are of the peripheral devices, are not synchronously controlled. At the asynchronous interval, the asynchronous target device is controlled independently of the operations of other devices, and controlled so as to arrive at the target position at the moving speed specified by the teaching program.

When the movement-related command separator 33 determines that the movement-related command is the movement-related command in the synchronous interval, the movement-related command separator 33 transmits the movement-related command to the main locus calculator 35. On the other hand, when the movement-related command separator 33 determines that the movement-related command is the movement-related command in the asynchronous interval, the movement-related command separator 33 separates the movement-related command into the command of each device, transmits the movement-related commands related to the welding robot 10 and the synchronous target device to the main locus calculator 35, and transmits the movement-related command related to the asynchronous target device to the movement-related command buffer 34.

Based on the movement state of the asynchronous target device, the movement-related command buffer 34 that is an example of the storage means selects one of the transmission of the movement-related command acquired from the movement-related command separator 33 to the sub-locus calculator 36 and the storage of the acquired movement-related command. The movement-related command buffer 34 acquires the movement state of the asynchronous target device corresponding to the acquired movement-related command from the sub-locus calculator 36. In the case that the acquired movement state of the asynchronous target device is "currently moving", the movement-related command buffer 34 stores the movement-related command of the asynchronous target device therein. The movement-related command buffer 34 stores the movement-related command in the order of acquiring the movement-related command from the movement-related command separator 33. On the other hand, in the case that the acquired movement state of the asynchronous target device is not "currently moving", the movement-related command buffer transmits the movement-related command to the sub-locus calculator 36.

When receiving a request of the movement-related command from the sub-locus calculator 36, the movement-related command buffer 34 transmits the acquired movement-related command of the asynchronous target device to the sub-locus calculator 36 in the acquired order. When the movement-related command of the asynchronous target device is not stored, the movement-related command buffer 34 transmits a movement completion notification that the movement of the asynchronous target device is completed to the command interpreter 32.

The main locus calculator 35 that is an example of the first control means calculates information on the movement (hereinafter, the information on the movement is referred to as movement information) of the welding robot 10 and synchronous target device based on the movement-related command determined to be the command in the synchronous interval by the movement-related command separator 33 or the movement-related command related to the welding robot 10 and synchronous target device in the asynchronous-interval movement-related command separated by the movement-related command separator 33. The movement information means information such as the movement time to the specified target position of each device and the moving speed. The main locus calculator 35 transmits the calculated movement information of each device to the motor driver 37. In the case that the welding robot 10 and the synchronous target device arrive at the target positions, the main locus calculator 35 makes a request for the next movement-related command to the command interpreter 32.

The sub-locus calculator 36 that is an example of the second control means calculates the movement information on the asynchronous target device based on the movement-related command related to the asynchronous target device in the asynchronous-interval movement-related commands separated by the movement-related command separator 33. The sub-locus calculator 36 transmits the calculated movement information of each device to the motor driver 37. The sub-locus calculator 36 sets the movement state of the asynchronous device, which transmits the movement information to the motor driver 37, to "currently moving". When the asynchronous device arrives at the target position, the sub-locus calculator 36 releases the movement state of the asynchronous device from "currently moving", and makes the request for the next movement-related command to the movement-related command buffer 34.

Based on the movement information of each device acquired from the main locus calculator 35 and the sub-locus calculator 36, the motor driver 37 that is an example of the first control means and the second control means controls the operations of the welding robot 10 and peripheral device through the interface 65 in FIG. 2 to move each device to the target position of each device.

(Asynchronous Interval In Teaching Program)

FIG. 4 is a view illustrating an example of a main teaching program of the embodiment.

The teaching program (hereinafter, referred to as a teaching program A) in FIG. 4 is an example of the main teaching program calling a sub-teaching program. In the example of FIG. 4, it is assumed that an operation of the positioner 20 of the synchronous target device or asynchronous target device is controlled. In the teaching program A, a teaching program B of the sub-teaching program is called to withdraw the welding robot 10 according to the command in a first line. The calling of the teaching program B is out of the asynchronous interval. The next command is executed when the withdrawal of the welding robot 10 is completed.

According to the command in a second line, the asynchronous interval of the positioner 20 is started to set the positioner 20 to the asynchronous target device. Therefore, in a teaching program C called according to the command in a third line and a teaching program D called according to the command in a fourth line, the movement-related command is executed while separated into the movement-related command of the welding robot 10 and the movement-related command of the positioner 20. The operations of the welding robot 10 and positioner 20 are not synchronously controlled, but the welding robot 10 and the positioner 20 move to the target positions at different moving speeds.

The welding robot 10 and the positioner 20 meet together according to the command in a fifth line of the teaching program A. For example, in the case that the welding robot 10 arrives at the target position before the positioner 20, the welding robot 10 waits for the arrival of the positioner 20 at the target position. When the positioner 20 arrives at the target position, the asynchronous interval of the positioner 20 is ended, and the welding robot 10 and the positioner 20 are synchronously controlled from the next command.

In the example of FIG. 4, the operations of the welding robot 10 and positioner 20 are controlled. Additionally, a peripheral device group including one or plural devices may be controlled. In the case that the asynchronous interval of the positioner 20 is set, the asynchronous-interval movement-related command is separated into commands of the welding robot 10, positioner 20, and peripheral device group. Based on the separated movement-related commands of the welding robot 10 and peripheral device group, the operations of the welding robot 10 and device in peripheral device group are synchronously controlled. Based on the separated movement-related command of the positioner 20, the operation of the positioner 20 is controlled without synchronizing with the operations of the welding robot 10 and peripheral device group.

In the teaching program of FIG. 4, the command in the asynchronous interval is described as "teaching program C call" or "teaching program D call". Alternatively, the command in the asynchronous interval may clearly be indicated like "asynchronous teaching program C call" or "asynchronous teaching program D call". For example, in the case that "asynchronous" is not described at a head of the command in the asynchronous interval, an error may be generated during the execution of the command. Therefore, the production of the teaching program can be prevented even if the operator falsely describes the command of the synchronous control in the asynchronous interval.

(Procedure of Teaching Program Executing Processing)

FIGS. 5A to 5D are flowcharts illustrating a flow example of teaching program executing processing of the embodiment.

Figure 5A:
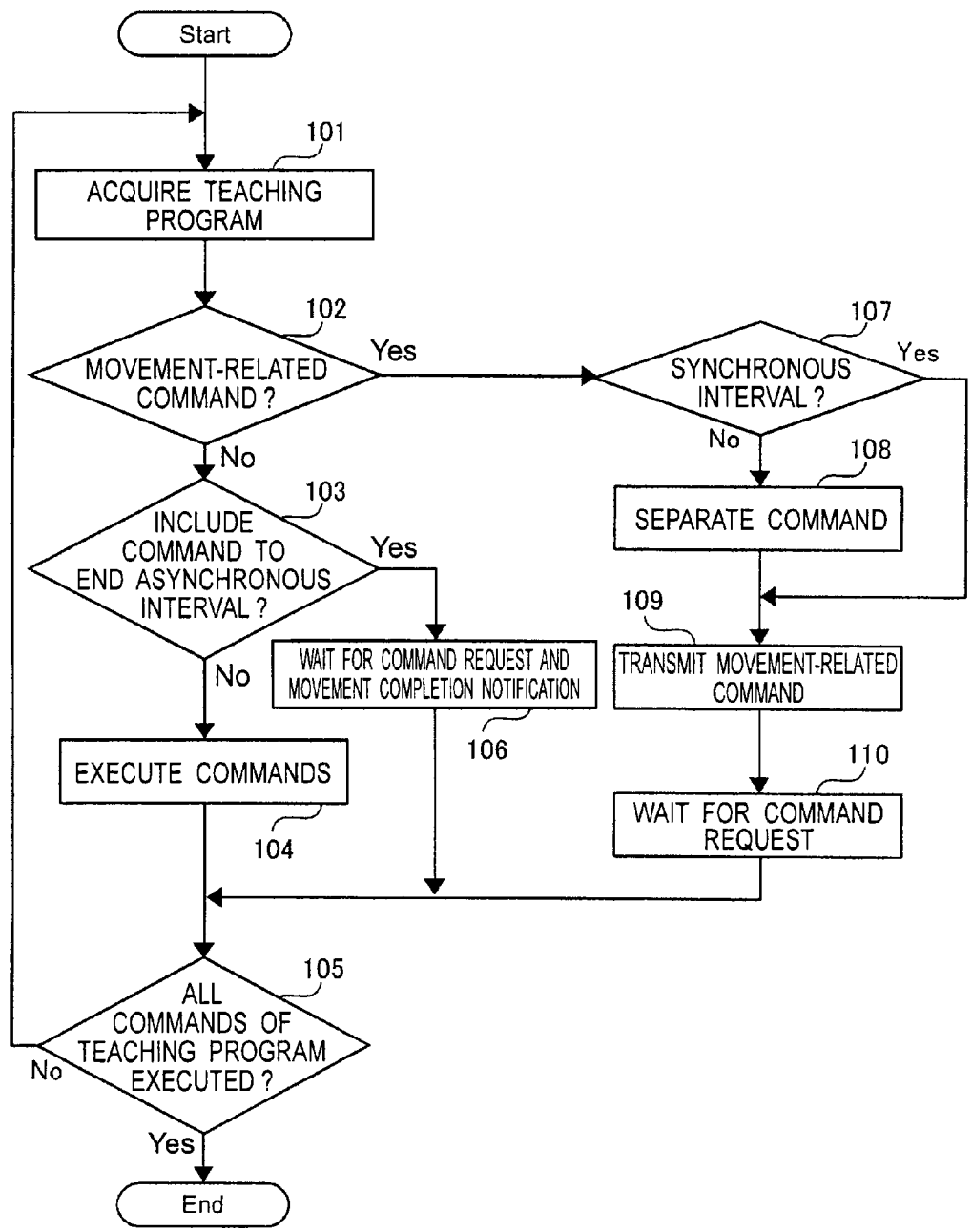
FIG. 5A is a flowchart showing an example of program execution process according to the embodiment.

FIG. 5A is a flowchart illustrating a flow example of processing of the command interpreter 32 and movement-related command separator 33.

The command interpreter 32 receives the input from the outside, and acquires the teaching program command corresponding to the received input from the teaching program storage 31 (Step 101). At this point, in the case that the command interpreter 32 acquires the movement command, the command interpreter 32 also acquires other movement-related commands such as a speed setting command, which are subsequent to the movement command. In the case that the command interpreter 32 acquires the non-movement-related command that drives the wire cutter 40, the command interpreter 32 also acquires the non-movement-related command subsequent to the non-movement-related command that drives the wire cutter 40.

The command interpreter 32 determines whether the command of the acquired teaching program is the movement-related command (Step 102). When the command is not the movement-related command (No in Step 102), the command interpreter 32 performs the acquired commands in the order described in the teaching program. When the acquired commands do not include the command to end the asynchronous interval (No in Step 103), the command interpreter 32 performs all the acquired commands (Step 104). The command interpreter 32 determines whether all the commands of the processing target teaching program are performed (Step 105). When all the commands of the teaching program are performed (Yes in Step 105), the teaching program executing processing is ended. On the other hand, when all the commands of the teaching program are not performed (No in Step 105), the flow goes to Step 101.

On the other hand, when the acquired commands include the command to end the asynchronous interval (Yes in Step 103), the command interpreter 32 sequentially executes the acquired commands in the order described in the teaching program, executes the command to end the asynchronous interval, and waits for the request for the movement-related command transmitted from the main locus calculator 35 and the movement completion notification of the asynchronous target device transmitted from the movement-related command buffer 34 (Step 106). The asynchronous interval of the asynchronous target device is ended when the command interpreter 32 receives both the request for the movement-related command and the movement completion notification. At this point, because of the end of the asynchronous interval, the command interpreter 32 may notify the movement-related command separator 33 that the subsequent movement-related command needs not to be separated in each device. When the command that is not executed yet exists in the commands acquired in Step 101 after the asynchronous interval, the command interpreter 32 goes to Step 105 after executing the command that is not executed yet.

When the affirmative determination (Yes) is made in Step 102, namely, when the command of the teaching program is the movement-related command, the command interpreter 32 transmits the movement-related command to the movement-related command separator 33. At this point, the command interpreter 32 transmits other movement-related commands, such as the speed setting command, which are acquired together with the movement command, to the movement-related command separator 33. The movement-related command separator 33 determines whether the acquired movement-related command is the synchronous interval command (Step 107).

When the movement-related command acquired by the movement-related command separator 33 is not the synchronous interval (No in Step 107), namely, when the movement-related command is the asynchronous interval command, the movement-related command separator 33 separates the movement-related command into command of each device (Step 108). The movement-related command separator 33 transmits the command related to the welding robot 10 and synchronous target device in the separated commands to the main locus calculator 35, and transmits the command related to the asynchronous target device to the movement-related command buffer 34 (Step 109). When the affirmative determination (Yes) is made in Step 107, namely, when the movement-related command acquired by the movement-related command separator 33 is the synchronous interval command, the flow goes to Step 109, and the movement-related command separator 33 transmits the movement-related command to the main locus calculator 35.

The command interpreter 32 waits for a command request from the main locus calculator 35 (Step 110). When the movement of the welding robot 10 and synchronous target device are completed, the command interpreter 32 receives the command request from the main locus calculator 35, and flow goes to Step 105.

Thus, the command interpreter 32 and the movement-related command separator 33 perform the pieces of processing according to the command of the teaching program.

Figure 5B:
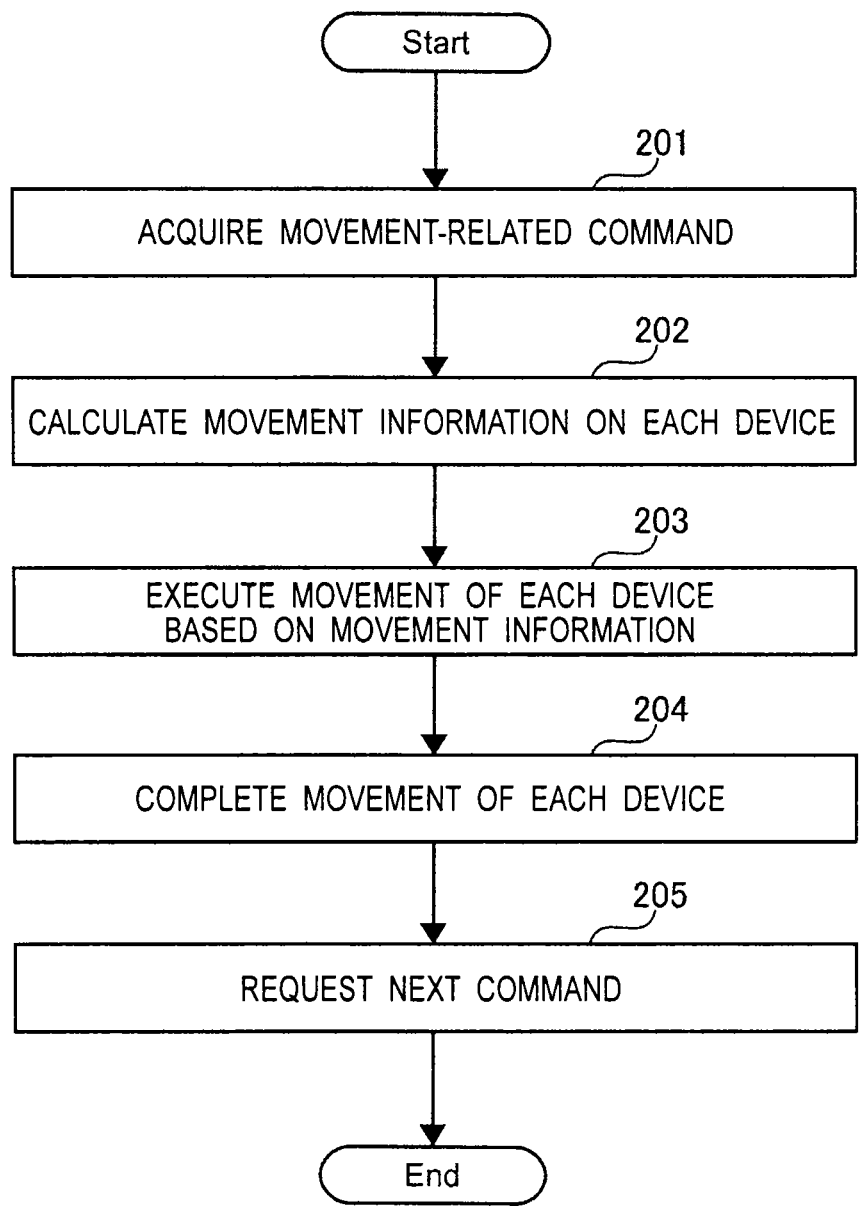
FIG. 5B is a flowchart showing an example of program execution process according to the embodiment.

FIG. 5B is a flowchart illustrating a flow example of processing in which the device main locus calculator 35 and the motor driver 37 move the welding robot 10 and the synchronous target device.

The main locus calculator 35 acquires the movement-related command from the movement-related command separator 33 in Step 109 of FIG. 5A (Step 201). Based on the acquired movement-related command, the main locus calculator 35 calculates the movement information on each of the welding robot 10 and synchronous target device (Step 202). Then the main locus calculator 35 transmits the calculated movement information to the motor driver 37.

Based on the movement information acquired from the main locus calculator 35, the motor driver 37 moves the welding robot 10 and the synchronous target device to target positions thereof (Step 203). Because the movement information used is calculated based on the command of the synchronous control, the devices are controlled so as to arrive simultaneously at the target positions. When the movement of each device is completed (Step 204), the main locus calculator 35 makes the request for the next movement-related command to the command interpreter 32 (Step 205). The request for the movement-related command is the request waited for by the command interpreter 32 in Step 106 or 110.

Thus, the main locus calculator 35 and the motor driver 37 perform the pieces of processing according to the movement-related command in the synchronous control.

Figure 5C:
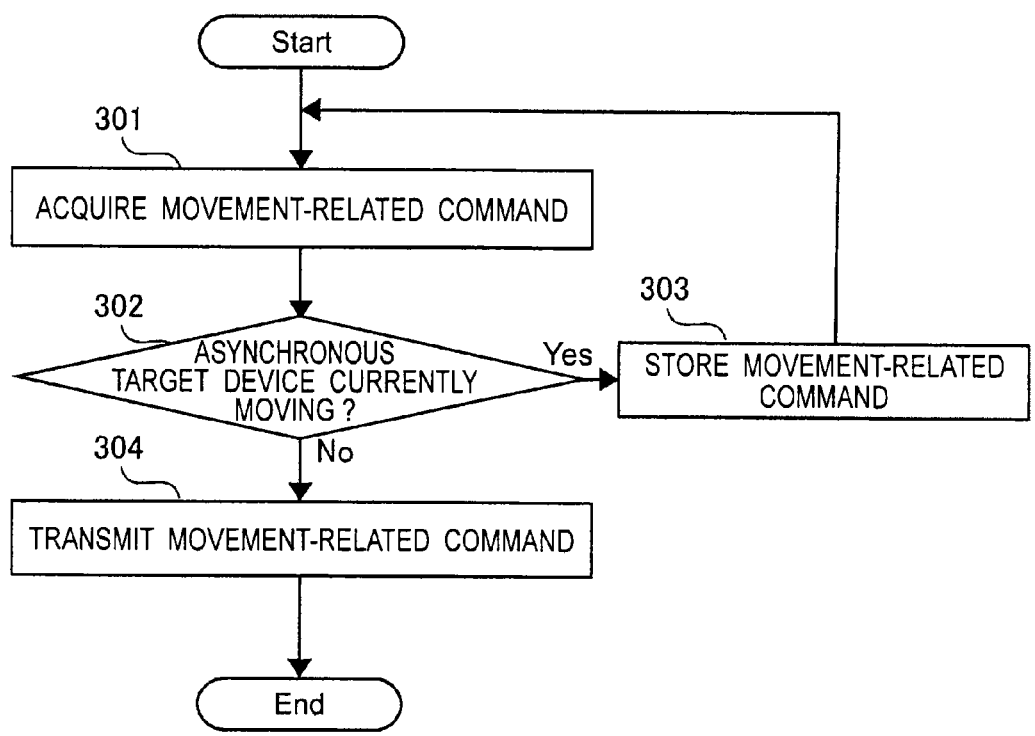
FIG. 5C is a flowchart showing the example of program execution process according to the embodiment.

FIG. 5C is a flowchart illustrating a flow example of processing in which the movement-related command buffer 34 stores the movement-related command.

The movement-related command buffer 34 acquires the movement-related command from the movement-related command separator 33 in Step 109 of FIG. 5A (Step 301). The movement-related command buffer 34 acquires the movement state of the asynchronous target device corresponding to the acquired movement-related command from the sub-locus calculator 36, and determines whether the asynchronous target device is "currently moving" (Step 302). When the movement state of the asynchronous target device is "currently moving" (Yes in Step 302), the movement-related command buffer 34 stores the movement-related command in the acquired order (Step 303). On the other hand, when the movement state of the asynchronous target device is not "currently moving" (No in Step 302), the movement-related command buffer 34 transmits the movement-related command to the sub-locus calculator 36 (Step 304).

Thus, the movement-related command buffer 34 perform the processing of storing the movement-related command.

Figure 5D:
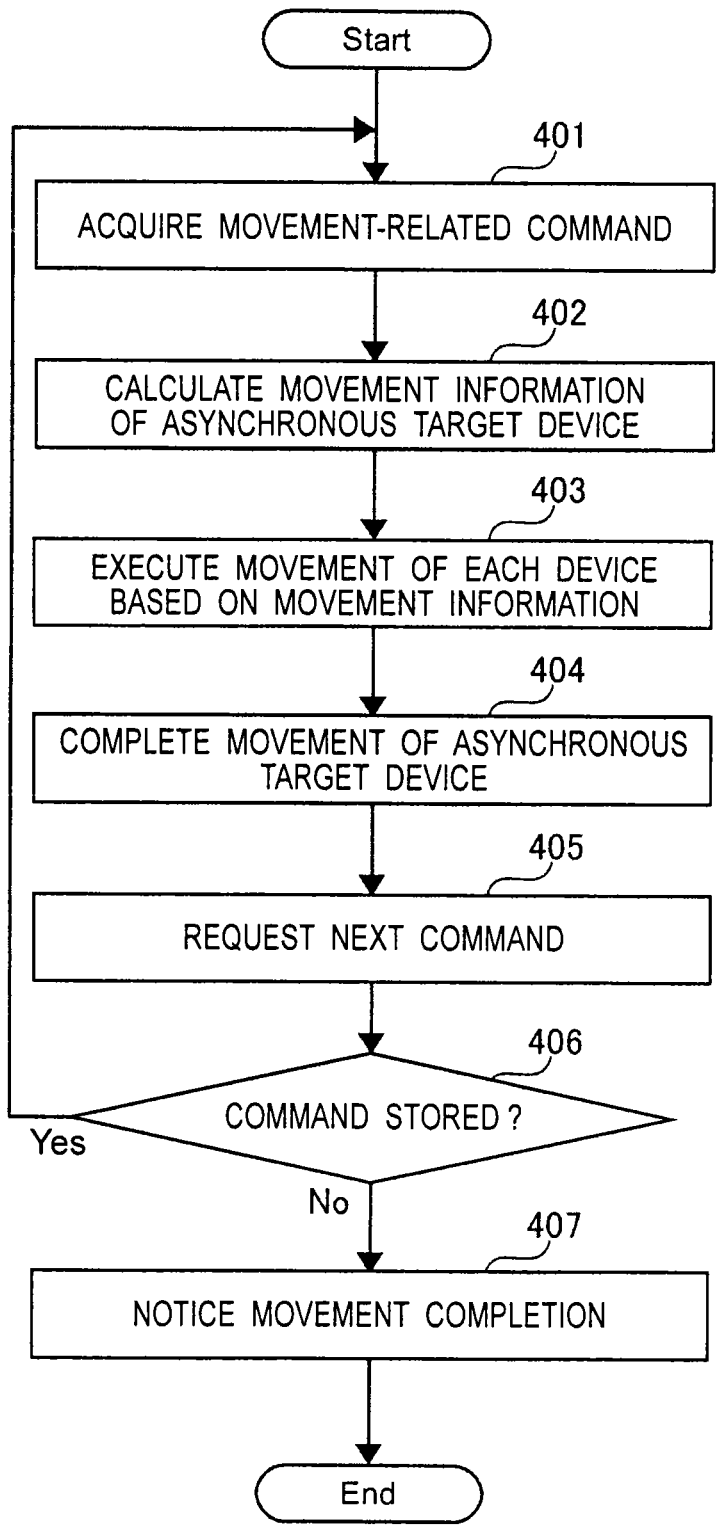
FIG. 5D is a flowchart showing the example of program execution process according to the embodiment.

FIG. 5D is a flowchart illustrating a flow example of processing in which the movement-related command buffer 34, the sub-locus calculator 36, and the motor driver 37 move the asynchronous target device.

The sub-locus calculator 36 acquires the movement-related command from the movement-related command buffer 34 in Step 304 of FIG. 5C (Step 401). Based on the acquired movement-related command, the sub-locus calculator 36 calculates the movement information on the asynchronous target device (Step 402). The sub-locus calculator 36 transmits the calculated movement information to the motor driver 37, and sets the movement state of the asynchronous device to "currently moving".

The motor driver 37 moves the asynchronous target device to the target position based on the movement information acquired from the sub-locus calculator 36 (Step 403). When the movement of the asynchronous device is completed (Step 404), the sub-locus calculator 36 releases the movement state of the asynchronous device from "currently moving", and makes the request for the next movement-related command to the movement-related command buffer 34 (Step 405).

The movement-related command buffer 34 determines whether the movement-related command of the asynchronous target device is stored (Step 406). When the movement-related command is stored (Yes in Step 406), the flow goes to Step 401, the movement-related command buffer 34 transmits the movement-related command to the sub-locus calculator 36 in the order in which the movement-related command is stored, namely, in the order from the initially-stored movement-related command. When other movement-related commands, such as the speed setting command, which accompany the movement command, the movement-related command buffer 34 transmits the accompanying movement-related command to the sub-locus calculator 36 together with the movement command. The movement-related commands such as the movement command and the speed setting command are separated into each device, and the separated movement-related commands of the asynchronous target device are stored and sequentially executed. Therefore, in each device, it is guaranteed that the commands are executed in the order in which the command is described in the teaching program. On the other hand, when the movement-related command is not stored (No in Step 406), the movement-related command buffer 34 transmits the movement completion notification of the asynchronous target device to the command interpreter 32 (Step 407).

Thus, the movement-related command buffer 34, the sub-locus calculator 36, and the motor driver 37 perform the pieces of processing according to the movement-related command of the asynchronous target device.

(Example of Teaching Program Executing Processing)

FIGS. 6A to 6C are views illustrating an example of the sub-teaching program of the embodiment.

The teaching programs in FIGS. 6A to 6C are examples of the sub-teaching program called from the teaching program A in FIG. 4. The teaching programs in FIGS. 6A to 6C are referred to as a teaching program B, a teaching program C, and a teaching program D, respectively. The teaching program B is one that withdraws the welding robot 10 to the position where the welding robot 10 does not interrupt the operation of the positioner 20 even if the positioner 20 rotates. The teaching program C is one in which the positioner 20 positions the workpiece. The teaching program D is one in which the welding robot 10 cuts the wire using the wire cutter 40.

The pieces of processing in the case that teaching program A in FIG. 4 and the teaching programs B to D in FIGS. 6A to 6C are executed will be described below. Similarly to the example in FIG. 4, in the examples of FIGS. 6A to 6C, it is assumed that the operation of the positioner 20 is controlled as the synchronous target device or the asynchronous target device. The following steps correspond to steps in FIGS. 5A to 5D.

The command interpreter 32 receives the input from the outside, and acquires the command of the teaching program A corresponding to the received input from the teaching program storage 31 (Step 101). Because the acquired command is "teaching program B call", the command interpreter 32 further acquires a command "movement command robot position A" of the teaching program B. Because "movement command robot position A" is the movement command, the command interpreter 32 transmits "movement command robot position A" to the movement-related command separator 33 (Step 102).

Because "movement command robot position A" is the command in the synchronous interval (Step 107), the movement-related command separator 33 transmits the movement command to the main locus calculator 35 (Step 109). The main locus calculator 35 calculates the movement information (Steps 201 and 202). The command "movement command robot position A" is the movement command to move the welding robot 10 to the position A, and the command "movement command robot position A" includes a movement content of the positioner 20 that is of the peripheral device. Therefore, the main locus calculator 35 calculates the movement information on each of the welding robot 10 and the positioner 20, and transmits the calculated movement information to the motor driver 37. The motor driver 37 synchronously controls the welding robot 10 and the positioner 20, moves the welding robot 10 to the position A, and moves the positioner 20 to the target position (Step 203).

When the movement of each of the welding robot 10 and the positioner 20 is completed (Step 204), the main locus calculator 35 makes the request for the next movement-related command (Step 205). When receiving the command request from the main locus calculator 35 (Step 110), the command interpreter 32 acquires the next command "movement command robot position B" (Steps 105 and 101). Similarly to the movement to the position A, the welding robot 10 and the positioner 20 are synchronously controlled, and the welding robot 10 moves to the position B. The execution of the teaching program B is ended when the movement of each of the welding robot 10 and the positioner 20 is completed.

Then the command interpreter 32 acquires a command "asynchronous interval positioner start" in the second line of the teaching program A (Step 101). Because the command "asynchronous interval positioner start" is the command to start the asynchronous interval of the positioner, but neither the movement-related command nor the command to end the asynchronous interval, the command interpreter 32 executes "asynchronous interval positioner start" to start the asynchronous interval of the positioner (Steps 102 to 104).

Therefore, from a command "teaching program C call" in the third line of the teaching program A, the movement-related command separator 33 separates the movement-related command into the movement-related command of the welding robot 10 and the movement-related command of the positioner 20, transmits the movement-related command of the welding robot 10 to the main locus calculator 35, and transmits the movement-related command of the positioner 20 to the movement-related command buffer 34.

The next command acquired by the command interpreter 32 is "teaching program C call" of the teaching program A, the command interpreter 32 further acquires "movement command positioner position a" of the teaching program C (Step 101). Because "movement command positioner position a" is the movement command and the command in the asynchronous interval, the movement-related command separator 33 separates the movement command into the movement command of the welding robot 10 and the movement command of the positioner 20 (Step 108). The movement-related command separator 33 transmits the command related to the welding robot 10 in the separated commands to the main locus calculator 35, and transmits the command related to the positioner 20 to the movement-related command buffer 34 (Step 109).

The movement-related command buffer 34 acquires the movement command of the positioner 20, and transmits the movement command to the sub-locus calculator 36 because the movement state of the positioner 20 is not "currently moving" (Steps 301, 302, and 304). The sub-locus calculator 36 acquires the movement command, and the movement of the positioner 20 to the position a is started (Steps 401 to 403). At this point, in the example of FIG. 4, it is assumed that the target position of the welding robot 10 is fixed in the three movement commands (the first, second, and fourth lines) of the teaching program C. Therefore, the movement of the welding robot 10 based on the separated movement command is instantaneously completed, and the main locus calculator 35 makes the request for the next movement-related command (Steps 201 to 205).

Then the command interpreter 32 acquires the next command "movement command positioner position b" and "moving speed setting positioner 10%" that is of a command to set the moving speed of the positioner 20. Because these commands are the movement-related command in the asynchronous interval, the movement-related command separator 33 separates the movement-related command into the movement-related command of the welding robot 10 and the movement-related command of the positioner 20 (Step 108). However, the movement of the welding robot 10 is instantaneously completed because the target position of the welding robot 10 is fixed, and the main locus calculator 35 makes the request for the next movement-related command (Steps 201 to 205).

On the other hand, because the movement state of the positioner 20 is "currently moving" when the positioner 20 moves currently to the position a, the movement command of the positioner 20 in "movement command positioner position b" and "moving speed setting positioner 10%" that is of the speed setting command of the positioner 20 are stored in the movement-related command buffer 34 (Steps 301 to 303). Thus, the movement-related command buffer 34 acquires the movement-related command of the positioner 20 that is acquired while the positioner 20 moves to the position a.

When receiving the command request from the main locus calculator 35, the command interpreter 32 acquires the next command in parallel to the movement of the positioner 20 (Steps 110, 105, and 101). The next command acquired by the command interpreter 32 is "movement command positioner position c" and "moving speed setting positioner 100%" of the teaching program C, and the movement-related command separator 33 separates the movement-related command into the command of each device. When the positioner 20 moves currently to the position a, the movement-related command of the positioner 20 is stored in the movement-related command buffer 34. On the other hand, the movement of the welding robot 10 is instantaneously completed because the target position of the welding robot 10 is fixed, and the main locus calculator 35 makes the request for the next movement command (Steps 201 to 205).

FIG. 7 is a view illustrating an example of a state in which the movement-related command buffer 34 stores the movement-related command. FIG. 7 illustrates the state in which, while the positioner 20 moves to the position a, the movement-related command (the commands in the second to fifth lines) of the positioner 20 of the teaching program C is transmitted to and stored in the movement-related command buffer 34. The movement command in the second line of the teaching program C is stored, and the speed setting command in the third line and the movement command in the fourth line, and the speed setting command in the fifth line are sequentially stored. Because the movement command is separated into the movement command of the welding robot 10 and the movement command of the positioner 20, only the movement command of the positioner 20 is stored in the movement-related command buffer 34.

When receiving the command request from the main locus calculator 35, the command interpreter 32 acquires the next command of the teaching program A (Steps 110, 105, and 101). The next command acquired by the command interpreter 32 is "teaching program D call" and further acquires a command "positioning unnecessity positioner" of the teaching program D. The command "positioning unnecessity positioner" is one that does not move the positioner 20 in the teaching program D and not include the movement command of the positioner in the movement command. Because "positioning unnecessity positioner" is neither the movement-related command nor the command to end the asynchronous interval, the command interpreter 32 executes "positioning unnecessity positioner" (Steps 102 to 104). Then the command interpreter 32 acquires "movement command robot position C".

Because "movement command robot position C" is the movement command and the command in the asynchronous interval, "movement command robot position C" is transmitted to the movement-related command separator 33 (Step 107). However, the positioner 20 does not move in the teaching program D, the movement command of the positioner 20 is not transmitted to the movement-related command buffer 34. The movement command of the welding robot 10 is transmitted to the main locus calculator 35 (Step 109), the welding robot 10 moves to the position C, and the main locus calculator 35 makes the request for the next movement-related command after the movement is completed (Steps 201 to 205). Because the next command of the teaching program D is "movement command robot position D", the welding robot 10 moves to the position D similarly to the movement to the position C.

Because the fourth to sixth lines of the teaching program D are neither the movement-related command nor the command to end the asynchronous interval, the command interpreter 32 sequentially executes the fourth to sixth lines of the teaching program D to cut the wire (Steps 102 to 104). The wire cutting is started using the welding robot 10 and the wire cutter 40 by executing "output command wire cutting signal ON" in the fourth line, and the wire cutting is performed for one second by executing "time waiting command 1 second" in the fifth line. By executing "input waiting command wire cutting completion ON" in the sixth line, the command interpreter 32 waits for the reception of a wire cutting completion signal from the wire cutter 40. When the wire cutting is completed, the command interpreter 32 acquires the next command (Steps 105 and 101).

Then the command interpreter 32 acquires the next command "movement command robot position E" of the teaching program D. After the welding robot 10 moves to the position E, the main locus calculator 35 requests the next movement-related command. The next command of the teaching program A acquired by the command interpreter 32 is "asynchronous interval positioner waiting", and the next command is not the movement-related command but the command to end the asynchronous interval (Steps 102 and 103). Therefore, the command interpreter 32 waits for the request for the movement-related command from the main locus calculator 35 and the movement completion notification from the movement-related command buffer 34 (Step 106).

The positioner 20 also moves while the command interpreter 32 and the main locus calculator 35 perform the pieces of processing of the teaching program D. When the positioner 20 arrives at the position a, the sub-locus calculator 36 makes the request for the next command to the movement-related command buffer 34 (Step 405). The next command is "movement command positioner position b", and the movement-related command buffer 34 transmits both the movement command and the speed setting command "moving speed setting positioner 10%" to the sub-locus calculator 36. The sub-locus calculator 36 executes the acquired command, and the positioner 20 moves to the position b at the changed moving speed (Steps 401 to 404). When the positioner 20 arrives at the position b, the sub-locus calculator 36 makes the request for the next command to the movement-related command buffer 34 (Step 405), and the movement-related command buffer 34 transmits both the movement command "movement command positioner position c" and the speed setting command "moving speed setting positioner 100%" to the sub-locus calculator 36. Similarly to the movement to the position b, the positioner 20 moves to the position c at the changed moving speed (Steps 401 to 404). Because the movement-related command of the asynchronous target device is executed in the order in which the movement-related command is acquired by the movement-related command buffer 34, it is guaranteed that the commands are executed in the order in which the command is described in the teaching program.

In the example of FIG. 4, because the positioner 20 moves slowly, the welding robot 10 waits for the arrival of the positioner 20 at the position c after arriving at the position E according to the movement command in the seventh line of the teaching program D. After the welding robot 10 arrives at the position E, the command interpreter 32 receives the command request from the main locus calculator 35. After the positioner 20 arrives at the position c, the sub-locus calculator 36 makes the request for the next command to the movement-related command buffer 34 (Step 405). However, the command is not stored in the movement-related command buffer 34 (Step 406). Therefore, the movement-related command buffer 34 transmits the movement completion notification to the command interpreter 32 (Step 407). When the command interpreter 32 receives the movement completion notification from the movement-related command buffer 34, the meeting of the welding robot 10 and the positioner 20 is completed, and the asynchronous interval of the positioner 20 is ended. Because all the commands of the teaching program A are executed, the pieces of processing of the teaching program A in FIG. 4 and the teaching programs B to D in FIGS. 6A to 6C are ended (Step 105).

Thus, the asynchronous interval is provided, and the movement commands in the asynchronous interval are separated into each device, whereby the operations of the welding robot 10 and synchronous target device are performed independently of the operation of the asynchronous target device. Therefore, the operator can shorten the cycle time by reducing the work to correct the teaching program without newly producing the teaching program in which the operations of the devices are mixed in consideration of the operations of the devices. Because the movement-related commands are sequentially executed while separated into the command of each device, it is guaranteed that commands of the teaching program including the movement-related command such as the speed setting command except for the movement command are executed in the order in which the command is described in the teaching program.

(Overlapping of Asynchronous Intervals)

In the examples of FIGS. 4 to 6C, the asynchronous interval is set to the one peripheral device. Alternatively, the asynchronous interval may be set to plural peripheral devices. The asynchronous intervals of the plural peripheral devices may overlap each other. FIG. 8 is a view illustrating an example of the main teaching program when the asynchronous intervals overlap each other. In the teaching program of FIG. 8, the slider is controlled as the peripheral device in addition to the positioner 20.

A teaching program E is called and executed by executing a command "teaching program call E" in the first line. The asynchronous interval of the slider is started by executing a command "asynchronous interval slider start" in the second line. A teaching program F is called and executed by executing a command "teaching program call F" in the third line. In the teaching program F, the welding robot 10 and the positioner 20 of the synchronous target device are synchronously controlled, and the slider of the asynchronous target device is operated while not synchronously controlled. The asynchronous interval of the positioner 20 is started by executing a command "asynchronous interval positioner start" in a fourth line. In a command "teaching program call G" in the fifth line and a command "teaching program call H" in the sixth line, the operation of the slider is controlled without synchronizing with the operations of the welding robot 10 and positioner 20, and the operation of the positioner 20 is controlled without synchronizing with the operations of the welding robot 10 and slider.

The welding robot 10, the slider, and the positioner 20 meet together by executing a command "asynchronous interval slider meet" in the seventh line and a command "asynchronous interval positioner meet" in the eighth line. When the movement of each of the welding robot 10, the slider, and the positioner 20 is completed, the asynchronous intervals of the slider and positioner 20 are ended.

Thus, in the case that the asynchronous intervals overlap each other, the asynchronous target devices are operated without performing the synchronous control, and the welding robot 10 and the asynchronous target device meet together when the asynchronous intervals are ended. In the case that the asynchronous intervals overlap each other, the movement-related command buffer 34 stores the movement-related command acquired from the movement-related command separator 33 while dividing the movement-related command into each asynchronous target device.

In the embodiment, an error may be generated when the movement command is directly described and executed in the asynchronous interval of the main teaching program. When the movement command cannot directly be described in the asynchronous interval of the main teaching program but is described in the sub-teaching program, a range that can be assigned as the asynchronous interval by the operator is restricted. Therefore, for example, the asynchronous interval falsely assigned by the operator such that the movement command described for the synchronous control is dealt with as the movement command in the asynchronous interval due to omission of the ending of the asynchronous interval can be reduced, and welding robot 10 and the peripheral device can be prevented from performing the operation that is not intended by the operator.

In the embodiment, an error may be generated when the command related to the welding work of the welding robot 10 is described and executed in the asynchronous interval. Because the operations of the welding robot 10 and the peripheral device are synchronously controlled during the welding work, the asynchronous target device is not independently operated. Therefore, the error is generated when the command related to the welding work is executed in the asynchronous interval, so that the peripheral device can be prevented from performing the operation that is not intended by the operator during the welding work.

In the embodiment, an error may be generated when the commands to start and end the asynchronous interval are executed in different teaching programs. For example, in the case that the asynchronous interval is described across plural teaching programs, the asynchronous interval is not ended in timing intended by the operator, but it is conceivable that the movement command for the synchronous control is executed as the command in the asynchronous interval. Therefore, each device can be prevented from performing the operation, which is not intended by the operator, by describing the commands to start and end the asynchronous interval in the same teaching program

DESCRIPTION OF SYMBOLS

10: welding robot
20: positioner
30: control device
31: teaching program storage
32: command interpreter
33: movement-related command separator
34: movement-related command buffer
35: main locus calculator
36: sub-locus calculator
37: motor driver
40: wire cutter
50: teaching pendant

The invention claimed is:

1. A control system comprising:
   a storage in which a teaching program is stored, operations performed by a robot and a peripheral device being described in the teaching program;
   a determination unit that discriminates an operation of the peripheral device in the teaching program stored in the storage as an asynchronous interval where the operation of the peripheral device is not synchronized with an operation of the robot or as a synchronous interval where the operation of the peripheral device is synchronized with the operation of the robot, and determines whether a movement-related command in a command of the teaching program is a command in the asynchronous interval or a command in the synchronous interval, the movement-related command being a command related to movement of at least one of the robot and the peripheral device;

a separator that separates an asynchronous command determined to be the command in the asynchronous interval by the determination unit into commands of the robot and the peripheral device;

a first controller that synchronously controls the operations of the robot and the peripheral device based on a synchronous command determined to be the command in the synchronous interval by the determination unit, and controls the operation of the robot based on a command related to the robot in the asynchronous command separated by the separator; and a second controller that controls the operation of the peripheral device without synchronizing with the operation of the robot based on a command related to the peripheral device in the asynchronous command separated by the separator.

2. The control system according to claim 1, further comprising a storage unit in which the commands related to the peripheral device in the asynchronous command separated by the separator is stored, the commands being acquired while the second controller controls the operation of the peripheral device, and the commands being stored in an order in which the commands are acquired, wherein the second controller executes the commands stored in the storage unit in the order in which the commands are acquired.

3. The control system according to claim 1, wherein, when a peripheral device group including one or a plurality of devices other than the peripheral device exists, and when, in the asynchronous interval, the operation of the peripheral device group is controlled in synchronization with the operation of the robot while the operation of the peripheral device is controlled without synchronizing with the operation of the robot, wherein, in the asynchronous interval, the first controller synchronously controls the operations of the robot and the peripheral device group based on the commands related to the robot and the peripheral device group in the asynchronous command separated by the separator, and wherein, in the asynchronous interval, the second controller controls the operation of the peripheral device without synchronizing with the operations of the robot and the peripheral device group based on the commands related to the peripheral device in the asynchronous command separated by the separator.

4. The control system according to claim 1, wherein, when one or plurality of peripheral devices other than the peripheral device to which asynchronous intervals, where the peripheral devices are controlled without synchronizing the operations of the robot, are set, and when at least parts of the asynchronous intervals of the peripheral devices overlap each other, the second controller controls the operations of the peripheral devices to which the asynchronous intervals are set without synchronizing the operations of the robot and other peripheral devices.

5. The control system according to claim 1, wherein the movement-related command is described in a sub-teaching program called by a main teaching program in the teaching program.

6. A method of controlling a robot and a peripheral device, comprising the steps of:

discriminating between an asynchronous interval and a synchronous interval with respect to a command group related to operation performed by the robot and the peripheral device, the command group being stored in a predetermined storage, the operation of the peripheral device being not synchronized with the operation of the robot in the asynchronous interval, the synchronous interval not being the asynchronous interval, and determining, by a determining unit, whether a movement-related command in the command group is a command in the asynchronous interval or a command in the synchronous interval, the movement-related command being a command related to movement of at least one of the robot and the peripheral device;

separating, by a separator, an asynchronous command determined to be the command in the asynchronous interval into commands of the robot and the peripheral device;

controlling synchronously, by a first controller, the operations of the robot and the peripheral device based on a synchronous command determined to be the command in the synchronous interval, and controlling the operation of the robot based on a command related to the robot in the separated asynchronous command; and controlling, by a second controller, the operation of the peripheral device without synchronizing with the operation of the robot based on a command related to the peripheral device in the separated asynchronous command.

* * * * *